United States Patent [19]

Zizza

[11] 4,349,861
[45] Sep. 14, 1982

[54] AUTOMOBILE CONTROL MODULE

[76] Inventor: John M. Zizza, 16 Lawson Ave., Revere, Mass. 02151

[21] Appl. No.: 164,171

[22] Filed: Jun. 30, 1980

[51] Int. Cl.$^3$ ............................................. H02B 1/04
[52] U.S. Cl. ................................ 361/347; 307/10 R; 361/355; 361/399
[58] Field of Search .................... 307/10 R, 112, 113, 307/115; 361/331, 346, 347, 349, 350, 351, 355, 380, 395, 399; 200/5 A, 18, 153 R, 296, 308

[56] References Cited

U.S. PATENT DOCUMENTS

| | | | |
|---|---|---|---|
| 2,614,156 | 10/1952 | Nims | 361/347 |
| 3,022,447 | 2/1962 | Henss | 361/346 |

*Primary Examiner*—Gerald P. Tolin
*Attorney, Agent, or Firm*—Joseph S. Iandiorio

[57] ABSTRACT

An automobile control module including a switch panel having ignition switch means, starter switch means, fuel switch means, and cooling switch means; and a circuit board mounted with the switch panel and having high-current foil conductors including a power bus foil having means for receiving a power cable; a fuel bus foil interconnected with the power bus foil through a first set of contacts in the ignition switch means; fuel output contact means, fuel fuse means interconnected between the fuel output contact means and the fuel switch means for connection through the fuel switch means to the fuel bus foil in one position of the fuel switch means; an ignition bus foil, ignition fuse means interconnects the ignition bus foil with the power bus foil; ignition output bus foil means including ignition output contact means, the ignition switch having a second set of contacts interconnecting the ignition bus foil with the ignition output bus foil means; a starter bus foil, the starter switch means interconnecting the starter bus foil with the ignition bus foil; and a cooling input bus foil, cooling fuse means interconnected between the power bus foil and the cooling input bus foil; cooling output bus foil means, including cooling output contact means, the cooling switch means interconnecting the cooling input bus foil with the cooling output bus foil means.

10 Claims, 4 Drawing Figures

AUTOMOBILE CONTROL MODULE

FIELD OF INVENTION

This invention relates to an automobile control module, and more particularly to such a module which contains in one unit a power input and all fuses, switches and interconnections thereof.

BACKGROUND OF INVENTION

In racing cars, newly constructed or converted from stock cars, electrical switches for starter, ignition, fuel, and water pumps, gauge and head lamps, are installed randomly wherever there is room using whatever types of switches and connectors are available. Often this results in use of improperly rated switches and improper wire sizes. Further, there is no standard provision for safety interlocks, such as for example precluding operation of fuel pumps when the ignition switch is off. In the usual installation yards of wire are led all over the car to provide power to each switch and connect each switch to the accessory. In the process of coursing the wires about the car, safety fusing is often completely overlooked. At best the fuses are installed randomly and in locations which make access difficult. Such installation using wires to interconnect the switches detracts seriously from the life of the switches: race cars produce strong and continuous vibration and the frequency of vibration of the free wire is quite mismatched with that of the switch lug to which it is attached. This mismatch accelerates loosening of the lug in the switch and can result in premature switch failure.

SUMMARY OF INVENTION

It is therefore an object of this invention to provide an improved, inexpensive automobile control module which substantially simplifies the task of wiring and fusing automobile electrical circuits.

It is a further object of this invention to provide such a module which contains in one package all necessary switching, fusing and interconnection circuits.

It is a further object of this invention to provide such a module in which the circuit components such as fuses are disposed in one location easily accessible for inspection and replacement.

It is a further object of this invention to provide such a module which contains safety switching interlocks to prevent operation of selected circuits when a main switch is open.

It is a further object of this invention to provide such a module which requires but a single input power cable to provide fused, switched power to a number of accessories.

It is a further object of this invention to provide such a module which supports wire interconnections with switch lugs and minimizes vibration mismatch between the wires and switch lugs.

This invention features an automobile control module including a switch panel which has ignition switch means, starter switch means, fuel switch means, and cooling switch means. There is also a circuit board mounted with the switch panel and having high-current foil conductors including a power bus foil with means for receiving a power cable. The circuit board includes a fuel bus foil interconnected with the power bus foil through a first set of contacts in the ignition switch means whereby the fuel supply can be shut down by the ignition switch for safety. There are fuel output contact means and fuel fuse means interconnected between the fuel output contact means and the fuel switch means. The fuel switch means in one position connects the fuel fuse means to the fuel bus foil. Ignition fuse means interconnect an ignition bus foil with the power bus foil. The ignition switch has a second set of contacts which interconnect the ignition bus foil with the ignition output bus foil means. The starter switch means interconnects a starter bus foil with the ignition bus foil. Cooling fuse means interconnect the power bus foil and a cooling input bus foil. There is cooling output bus foil means including cooling output contact means, and the cooling switch means interconnects the cooling input bus foil with the cooling output bus foil means.

In a preferred embodiment the fuel fuse means includes a fuel fuse holder and a foil interconnected with each end of the fuel fuse holder. The fuel fuse means may include two fuel fuse holders with a foil interconnected with each end of each of the fuel fuse holders. The fuel switching means may thus include two switches, one interconnected with each of the fuel fuse holders. The fuel switch means may have a second position whereby it connects the fuel fuse means directly to the power bus foil for momentary testing of the fuel pumps. The cooling output bus foil means may include a low cool bus foil and a low cool output contact, and high cool bus foil and high cool output contact, with the cooling switching means including high and low cool contacts.

There may be provided a line-lock bus foil and a line-lock fuse means which interconnects the line-lock bus foil and the power bus foil with line-lock output contact means connected with the line-lock bus foil.

The switch means are connected by wire conductors to the circuit board, and all other connections are made by the high-current foil conductors. The module may include a mounting plate for supporting the circuit board in spaced relation so that the power cable may be snugly received between the board and the mounting plate.

The module may also include a lamp input bus foil means and lamp fuse means interconnected between the power bus foil and lamp input bus foil. There is a lamp output bus foil means including lamp output contact means, and lamp switch means which interconnect the lamp input bus foil and lamp output bus foil. The lamp switch means may include gauge lamp contacts and head lamp contacts. The lamp fuse means may include a gauge lamp fuse holder and a head lamp fuse holder. The lamp input bus foil means may include a gauge lamp input foil bus and head lamp input foil bus, and the lamp output bus foil means may include a gauge lamp output bus foil and contact and head lamp output bus foil and output contact.

DISCLOSURE OF PREFERRED EMBODIMENT

Other objects, features and advantages will occur from the following description of a preferred embodiment and the accompanying drawings, in which.

The invention may be accomplished with an automobile control module having a switch panel on which are mounted all the necessary switches and a circuit board which is mounted with the switch panel. Typically the circuit board is secured to in spaced relation to the mounting plate, which is fixed to the switch panel. The circuit board contains all the required fuse means, that is fuse holders and fuses, on its top surface, and on its bottom surface contains all of the necessary interconnection by means of high-current foil buses. The switches are interconnected with the circuit board by means of wires. All of the accessories ans devices controlled by the module are connected to output contacts mounted along the rear edge of the board, and power is supplied to the circuit board by means of a cable which is snugly held between the circuit board and the mounting plate.

Figure 1:
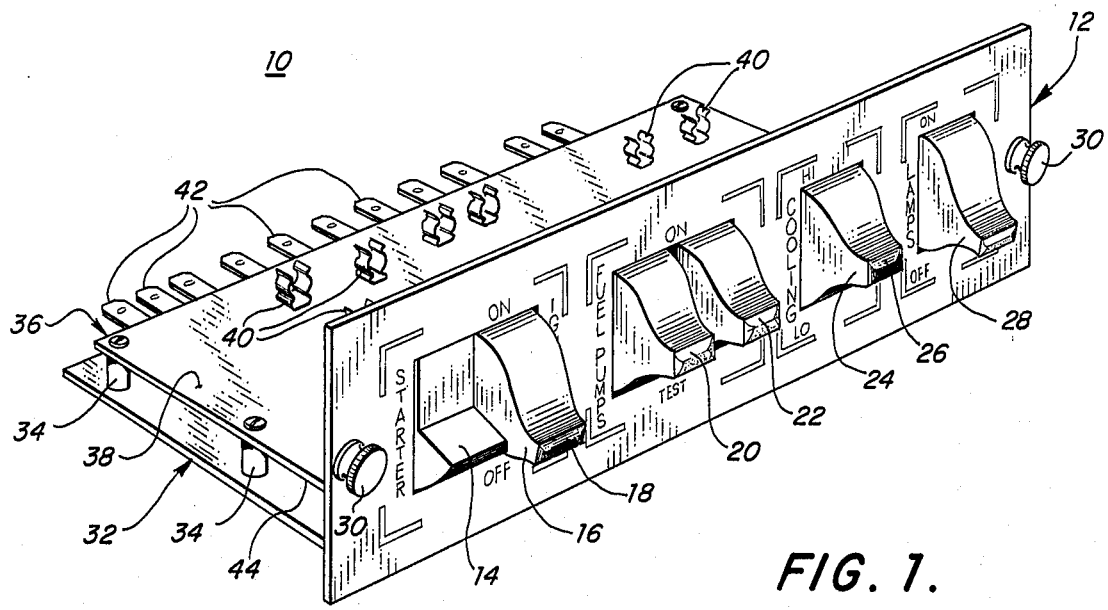
FIG. 1 is an axonometric view of an automobile control module according to this invention.

There is shown in FIG. 1 an automobile control module 10 according to this invention which includes a switch panel 12 including starter switch 14 which has an "Off" position and a momentary "On" position, and ignition switch 16 which has "On" position and an indicator 18. Switch panel 12 also includes fuel pump switch means, switches 20 and 22, which have "Off", "Test", and "On" positions, and cooling switch 24 which has "Off", "High", and "Low" positions and indicator 26. Lamp switch 28, also included on panel 12, has an "Off" position, a "Gauge Lamps On" position, and a "Gauge Lamps and Headlights On" position.

Panel 12 includes thumb screws 30 for mounting to an automobile dashboard or the like, and is fixed to mounting plate 32, from which rise bushings 34 that support circuit board 36. Circuit board 36 carries on its top surface 38 a plurality of fuse holders 40 and fuses, not shown. Along the back edge of circuit board 36 are output contacts 42 for receiving connectors from various accessories and equipment.

Figure 2:
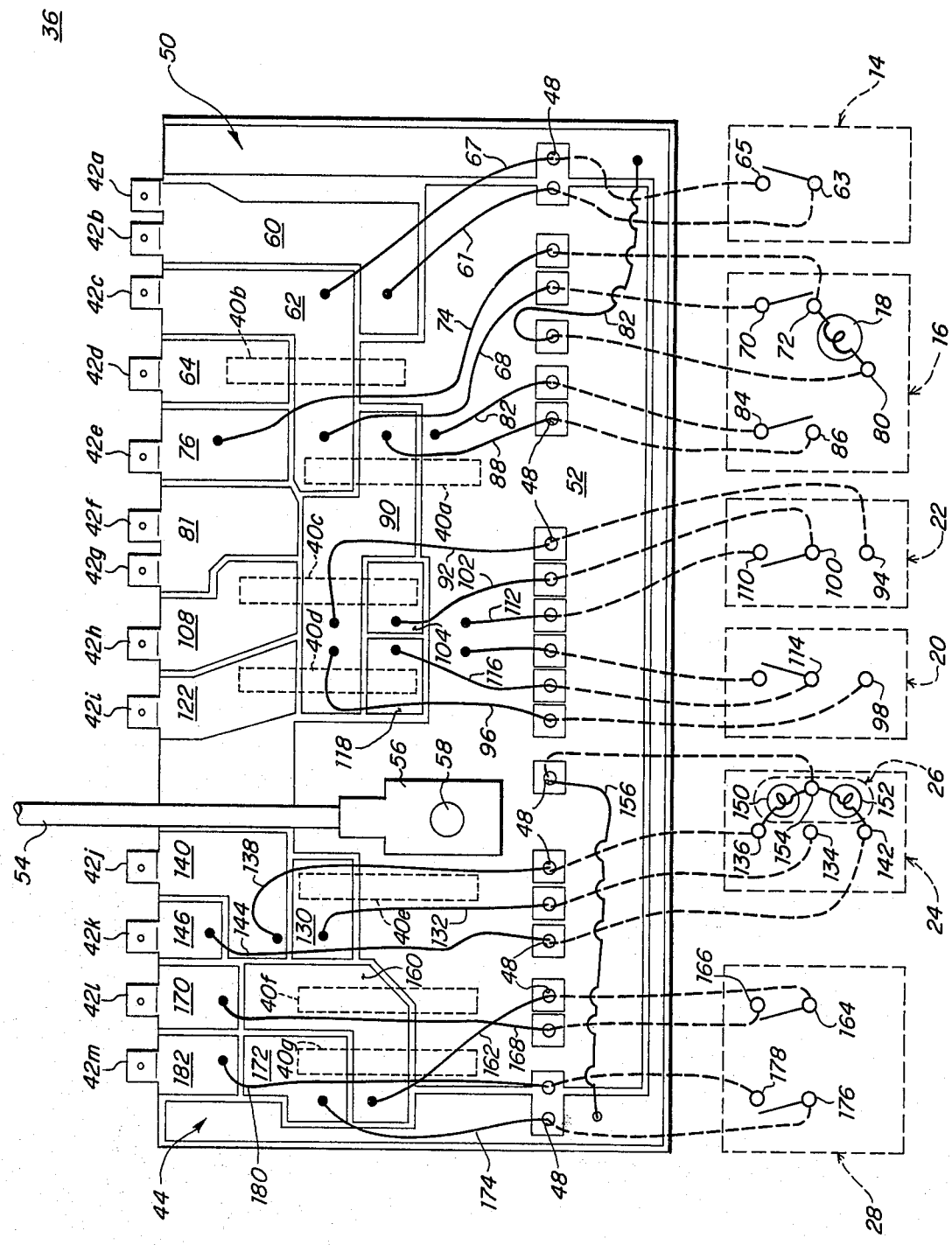
FIG. 2 is a plan view of the bottom of the circuit board in FIG. 1 showing the foil pattern and switch interconnction according to this invention.

On the bottom surface 44 of circuit board 38 there are high-current-carrying foil conductors including ground bus foil 50, FIG. 2, and power bus foil 52. Power bus foil 52 receives battery power from cable 54 through terminal 56 and lug 58, connected to power bus foil 52.

Wires from the switches pass from the top 38 to the bottom 44 of board 36 through holes 48; fuses 40, shown in phantom, are actually positioned on the top of the board but are shown in place on the bottom in order to facilitate an understanding of the electrical connection.

Starter switch 14 provides power to starter bus foil 60 and starter output contacts 42a and 42b from ignition bus foil 62. Starter bus foil 60 is interconnected through wire 61 to contact 63 of starter switch 14. When contact 63 is closed on contact 65 connection is made through wire 67 to ignition bus foil 62. Ignition bus foil 62 receives power through ignition fuse 40a interconnected between power bus foil 52 and igntion bus foil 62. Output contacts 42c and 42b may be used for interconnection with a remote starter device. Line-lock fuse 40b provides power from power bus foil 52 to line-lock output bus foil 64, and then through output contacts 42d to a line-lock switch that locks the transmission and prevents movement of the auto until a mechanical release has been actuated.

Fused power is supplied from ignition bus foil 62 by wire 68 to contact 70 of ignition switch 16. When contact 70 is closed on contact 72, power is routed through wire 74 to ignition output bus foil 76 and ignition output contact 42e.

When contact 70 is closed on contact 72, power is supplied to energize indicator 18, interconnected between contact 72 and contact 80, connected through wire 82 to ground bus foil 50. Power bus 52 is connected through wire 82 to contact 84 of switch 16. When contact 84 is closed on contact 86, power is provided through wire 88 to fuel bus foil 90.

Fuel bus foil 90 is connected by wire 92 to contact 94 in right fuel pump switch 22, and through wire 96 to contact 98 in left fuel pump switch 20. Thus when contact 100 is closed on contact 94 in switch 22, power is provided through wire 102 to input foil 104, then through fuse and fuse holder 40c to output foil 108 and contact 42h. Foil 81 and contacts 42f and 42g may be used as a shunt path to interconnect a serial safety switching device such as an RPM Limiter switch in series with the ignition. When contact 100 is closed on contact 110 in the test position, power is provided directly from power bus 52 on line 112 to foil 104, bypassing ignition switch control through contacts 84 and 86. Similarly, when contact 114 is closed on contact 98 and switch 20, power is provided through line 116 to foil 118, fuse and fuse holder 40d to foil 122 and output contact 42i.

Power is supplied from foil 52 through cooling fuse 40e to foil 130. From foil 130 power is delivered by wire 132 to contact 134 in cooling switch 24. When contact 134 is in the high-cool position, it closes on contact 136 and through wire 138 provides power to foil 140 and output contact 42j. When contact 134 is closed on contact 142, power is provided over wire 144 through foil 146 and output contact 42k, to the low-cool output. When contact 134 is in the high-cool position against contact 136, lamp 150 is energized in indicator 26. When contact 134 is in the low-cool position closed against contact 142, lamp 152 is energized in indicator 26.

Both indicator lamps 150 and 152 are tied to ground foil 50 by contact 154 and wire 156.

When lamp switch 28 is closed, power is delivered from power bus foil 52 through fuse 40f to foil 160, then through wire 162 to contact 164 in switch 28, and from there through contact 166 and wire 168 to foil 170 and headlight output terminal 421. Power bus foil 52 is also connected by fuse and fuse holder 40g to foil 172, then through wire 174 to contact 176 at switch 28, and from contact 178 through wire 180 to foil 182 and gauge lamp output contact 42.

Figure 3:
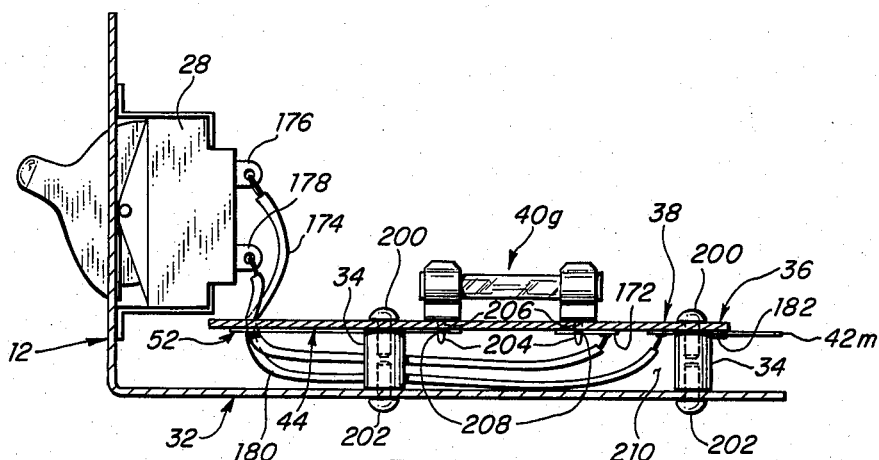
FIG. 3 is a side elevational view of the module of FIG. 1 showing portions in section.
Figure 4:
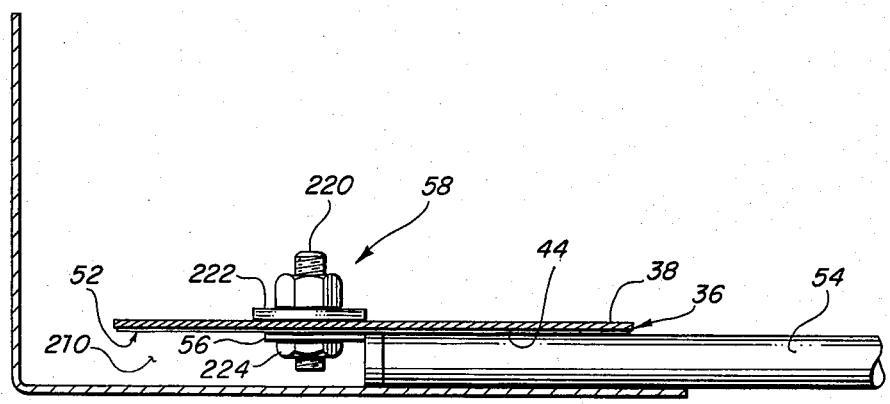
FIG. 4 is a view similar to that in FIG. 3 showing attachment of the power cable.

Circuit board 36 is fixed to bushings 34 by any normal means, for example screws 200, FIG. 3, which threadably engage with holes in the tops of bushings 34. Similarly screws 202 may be used to mount bushings 34 to plate 32 and provide the spaced relation between board 36 and plate 32. Fuse means 40g, illustrative of all the fuse means used, may include solder lugs 204 which pass through holes 206 in circuit board 36 and then through holes 208 in the respective foils to which they are permanently soldered for mechanical and electrical interconnection. The space 210 provided between circuit board 36 and mounting plate 32 by the use of bushings 34 is sized to snugly fit cable 54. Lug 58 may include a threaded bolt 220 and washer 222 with a nut 224 to clamp terminal 56 against the underside 34 of board 36 so that it makes electrical contact with power bus foil 52.

Other embodiments will occur to those skilled in the art and are within the following claims:

What is claimed is:

1. An automobile control module comprising:
   a switch panel including ignition switch means, starter switch means, fuel switch means, and cooling switch means; and
   a circuit board mounted with said switch panel and having high-current foil conductors including a power bus foil having means for receiving a power cable;
   a fuel bus foil interconnected with said power bus foil through a first set of contacts in said ignition switch means;
   fuel output contact means, fuel fuse means interconnected between said fuel output contact means and said fuel switch means for connection through said fuel switch means to said fuel bus foil in one position of said fuel switch means;
   an ignition bus foil; ignition fuse means interconnecting said ignition bus foil with said power bus foil; ignition output bus foil means including ignition output contact means, said ignition switch having a second set of contacts interconnecting said ignition bus foil with said ignition output bus boil means;
   a starter bus foil, said starter switch means interconnecting said starter bus foil with said ignition bus foil;
   a cooling input bus foil, cooling fuse means interconnected between said power bus foil and said cooling input bus foil, cooling output bus foil means, including cooling output contact means, said cooling switch means interconnecting said cooling input bus foil with said cooling output bus foil means.

2. The module of claim 1 in which said fuel fuse means includes a fuel fuse holder and a foil interconnected with each end of said fuel fuse holder.

3. The module of claim 1 in which said fuel fuse means includes two fuel fuse holders and a foil interconnected with each end of each of said fuel fuse holders, and said fuel switch means includes two switches, one interconnected with each of said fuel fuse holders.

4. The module of claim 1 in which said fuel switch means has a second position which interconnects said fuel fuse means directly to said power bus foil.

5. The module of claim 1 further including a line-lock bus foil, line-lock fuse means interconnecting said line-lock bus foil and said power bus foil and line-lock output contact means connected with said line-lock bus foil.

6. The module of claim 1 in which said cooling output bus foil means includes a low-cool bus foil and low-cool output contact and high-cool bus foil and high-cool output contact, and said cooling switch means includes high and low cool contacts.

7. The module of claim 1 in which said switch means are connected by wire conductors to said circuit board and all other connections are made by said high-current foil conductors.

8. The module of claim 1 in which said module includes a mounting plate for supporting said circuit board in spaced relation and the power cable is snugly received between said board and plate.

9. The module of claim 1 further including lamp input bus foil means, lamp fuse means interconnected between said power bus foil and lamp input bus foil, lamp output bus foil means including lamp output contact means, and lamp switch means interconnecting said lamp input bus foil and lamp output bus foil.

10. The module of claim 9 in which said lamp switch means includes gauge lamp contacts and head lamp contacts, said lamp fuse means includes a gauge lamp fuse holder and a head lamp fuse holder, said lamp input bus foil means includes a gauge lamp input foil bus and head lamp input foil bus, and said lamp output bus foil means includes a gauge lamp output bus foil and gauge lamp output contact and a head lamp output bus foil and head lamp output contact.

* * * * *